(No Model.)
S. K. DICKERSON & C. D. KEE.
MEANS FOR SECURING COLLARS TO CRANK PINS.
No. 479,406. Patented July 26, 1892.
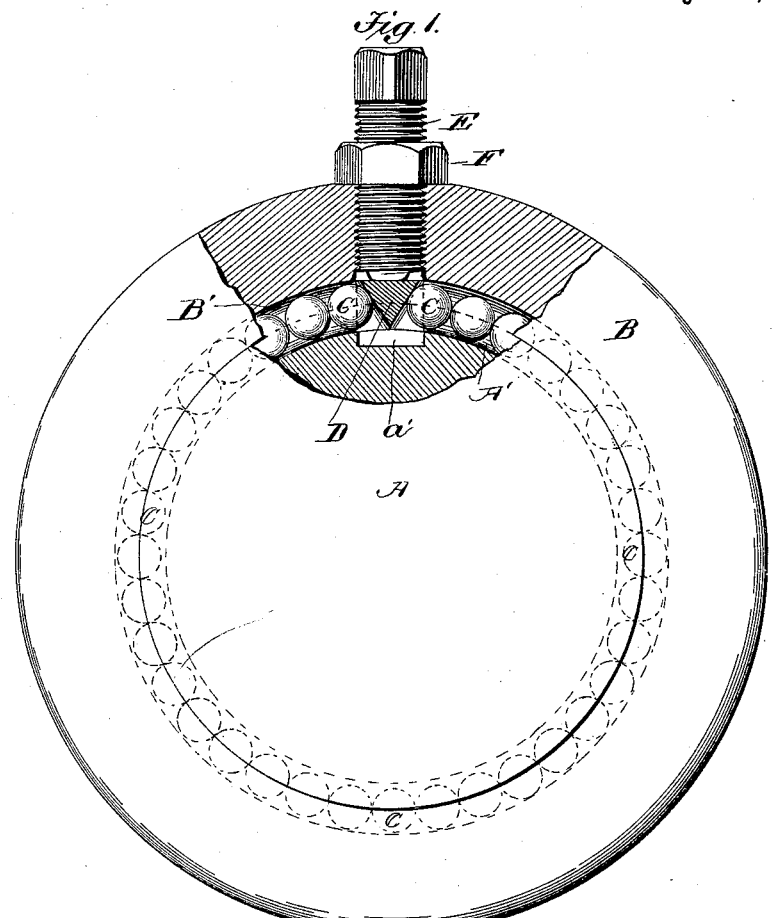
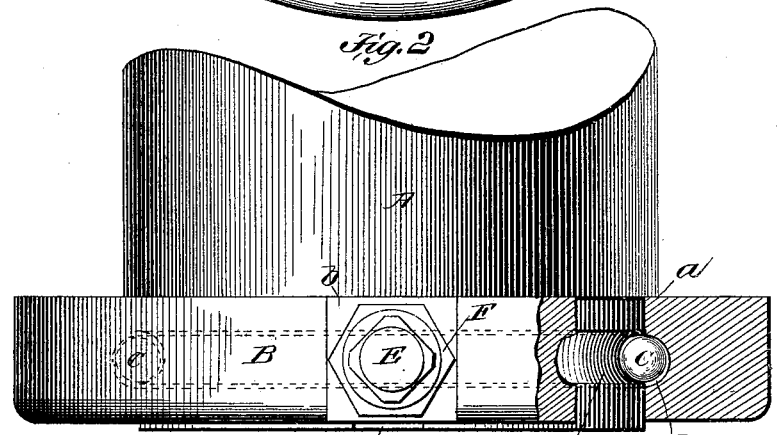
Witnesses
J. Stansbury
E. F. Hood
Inventors
Simeon K. Dickerson
and
Charles D. Kee
By their Attys
Wallee & Co

UNITED STATES PATENT OFFICE.

SIMEON K. DICKERSON AND CHARLES D. KEE, OF ROANOKE, VIRGINIA.

MEANS FOR SECURING COLLARS TO CRANK-PINS.

SPECIFICATION forming part of Letters Patent No. 479,406, dated July 26, 1892.

Application filed March 26, 1892. Serial No. 426,560. (No model.)

*To all whom it may concern:*

Be it known that we, SIMEON K. DICKERSON and CHARLES D. KEE, citizens of the United States, residing at Roanoke, in the county of Roanoke and State of Virginia, have invented certain new and useful Improvements in Means for Securing Collars to Crank-Pins; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to a new and useful improvement in means for securing collars to crank-pins; and it consists, generally stated, in providing the crank-pin and collar with registering-grooves and inserting in said grooves a series of spheres or balls or other form of bodies, whereby longitudinal movement of the collar on the crank-pin is prevented.

A second feature of the invention consists in the peculiar formation of the locking-wedge for binding the balls, also preventing play of the collar on the crank-pin, and, finally, in the construction and arrangement of the several parts, all as will hereinafter be described and afterward pointed out in the claims.

Referring to the drawings forming a part of this specification, wherein like letters of reference refer to like parts wherever they occur, Figure 1 is a face view, partly in section. Fig. 2 is a top plan view, partly in section; and Fig. 3 is a perspective view of the locking-wedge.

In the drawings, A indicates the crank-pin reduced at its end and provided with a shoulder $a$, against which the collar abuts when in position.

A' indicates a circumferential groove, semi-circular in cross-section, in the reduced portion on the end of the crank-pin, which groove registers or substantially registers with another and similar groove B' in the interior periphery of the collar B when said collar is in place.

C indicates the balls or spheres filling the space formed by the two grooves A' and B' and extending nearly the entire length thereof, a space being left between two of said balls for the reception of the locking-wedge.

D indicates a locking-wedge adapted to slide in a way in the end of the crank-pin, said wedge being provided with grooves $d$ in its inclined faces, which grooves receive a portion of two adjacent balls, thus preventing longitudinal movement when the wedge is forced home.

E indicates a binding-screw passing through the collar B and impinging against the face of the wedge, the function of which being to force the wedge inwardly between the two adjacent balls to separate them and tightly bind the intermediate balls or spheres.

F indicates a jam-nut on the binding-screw E, said jam-nut finding resistance on a plane $b$ on the collar.

To insert the balls in the grooves it is only necessary to remove the wedge D, when access is gained to the interior of the groove, which access may obviously be used for the removal, as well as the insertion, of the balls or spheres.

We prefer to make the groove B' in the collar slightly in advance of the groove in the crank-pin in order to throw the respective grooves off center, so that when the locking-wedge is forced home the inner shoulder of the groove B' will impinge against the balls and force the collar against the shoulder $a$. We can also compensate for any slight wear of the balls or their surrounding grooves through this medium.

It is obvious that although we have herein shown and described the binding bodies as being spheres any other suitable form may be used with slight changes in the corelative parts.

Having thus described our invention, what we claim, and desire to secure by Letters Patent of the United States, is—

1. The combination, with a crank-pin, of a collar, balls interposed between said crank-pin and collar, a wedge adapted to enter between two of said balls and bind the remaining balls, and a binding-screw for impinging against said wedge, substantially as and for the purposes described.

2. The combination, with a crank-pin, of a collar, balls interposed between said crank-pin and collar, a wedge seated in the crank-pin and adapted to enter between two of said balls, and a binding-screw, substantially as and for the purposes described.

3. The combination, with a crank-pin provided with a groove, of a collar provided with a similar groove, balls in said grooves, and a wedge for forcing said balls together, substantially as and for the purposes described.

4. The combination, with a crank-pin provided with a circumferential groove, of a collar provided with a similar groove to one side of the groove in the crank-pin, balls in the space formed by the grooves, a wedge adapted to enter between two of said balls, said wedge being provided with grooves in its inclined faces, and a binding-screw, substantially as and for the purposes described.

In testimony whereof we affix our signatures in presence of two witnesses.

SIMEON K. DICKERSON.
    CHAS. D. KEE.

Witnesses:
 FRANK BONSACK,
 FRANK BRAWFORD.